United States Patent Office 3,211,576
Patented Oct. 12, 1965

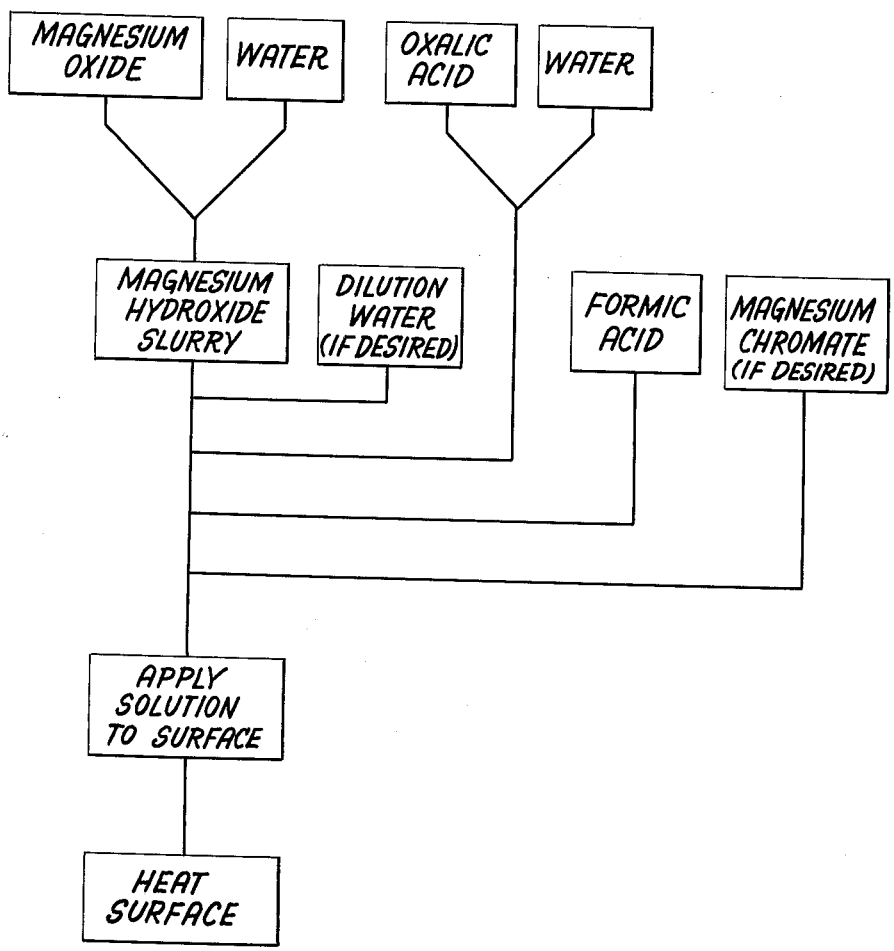

3,211,576
PROCESS FOR COATING FERROUS MATERIAL AND MATERIAL COATED BY SUCH PROCESS
Herbert B. Forslund, Williamstown, Mass., and James W. Fulton, Lyndhurst, Ohio, assignors to General Electric Company, a corporation of New York
Filed Oct. 23, 1962, Ser. No. 232,620
6 Claims. (Cl. 117—127)

This invention relates to coatings for ferrous material and, more particularly, to a process for coating ferrous material, and the material coated by such process.

In many fields of use, in particular, in the electrical industry, it is necessary to provide a coating on ferrous material. This coating desirably performs the functions of insulating, separating and purifying the ferrous material as discussed below. For example, in the transformer art, the cores of the transformers are usually formed of a ferrous material, such as, for example, silicon steel, which may be provided with a preferred grain growth orientation to provide optimum electrical and magnetic properties. It has been found necessary to provide a coating on each of the various layers of ferrous material in the core. This coating will perform three separate functions. The first function of the coating is to provide separation of the various turns or layers of the material, for example, when used in cores, to prevent their sticking or welding together during high temperature anneals. A second function is that of aiding in the chemical purification of the ferrous material to develop the desired optimum magnetic characteristics of such material. The third function of the coating is to form on the surface of the ferrous material an insulation which will have sufficient electrical strength to provide for the electrical insulation of one layer of ferrous material from the next, for example, during its use as a core in a transformer.

In the present state of the electrical apparatus art, the most widely used coating for the ferrous material which is used as the magnetic core of the electrical apparatus is a coating of magnesium oxide and/or magnesium hydroxide. These coatings are, in general, applied to the ferrous material in the form of a suspension of magnesium hydroxide in water. The suspension comprises a quantity of magnesium oxide in water and is mixed sufficiently for the desired application, the magnesium oxide being hydrated to an extent depending on the character of the oxide used. The term "magnesium hydroxide slurry" as used throughout the remainder of this specification will mean a suspension of magnesium hydroxide in water, which may include magnesium oxide, which has not hydrated in the suspension. Further, the term "magnesium hydroxide coating" will be understood to mean a coating which may also include unhydrated magnesium oxide.

In the use of ferrous material, especially silicon steel, for the magnetic cores of transformers, the steel is generally annealed first to provide a grain growth anneal which develops the optimum magnetic properties of the silicon steel. This anneal is usually carried out at a temperature ranging from approximately 950 to 1200° C. This anneal also aids in purifying the steel, aided by the coating placed on the steel. After the magnetic core has been formed, a stress relief anneal is provided to relieve the stresses which have developed in the silicon steel of the magnetic core due to the mechanical working of the steel in formation of such core. These stress relief anneals are generally carried out at a temperature of approximately 840° C.

A more economical method of manufacture has been developed in which the grain growth anneal of the silicon steel is deferred until after the core has been formed. In this method it is then possible to provide both a grain growth anneal and a stress-relief anneal at the same time. A suitable temperature of approximately 1150° C. is used, under proper atmospheric conditions, to provide this dual anneal. However, as will be understood, in either instance it is necessary to provide an interlaminar separator to prevent the sticking or welding of the turns during the anneal, as well as to provide the other two functions as hereinbefore noted.

As will be well understood, where the grain growth anneal is provided prior to the formation of the magnetic core, the coating, which is placed on the steel before the anneal, will be hardened by the anneal. However, where the grain growth anneal is provided after the formation of the core, it will be apparent that the coating will not be in the hard form which is formed during the high temperature anneal. Therefore, in the formation of the core, the coating is more readily apt to flake and break off during the handling which is necessary in making the magnetic core.

As hereinbefore noted, the coating which is generally applied to ferrous material in the present state of the art is a coating of magnesium hydroxide which is applied in the form of a water slurry. The coating is then dried to leave a thin layer of coating material on the surface of the ferrous material. In the present state of the art it is not, in general, possible to provide a satisfactory coating on the surface of a ferrous material using a substantially pure magnesium hydroxide slurry. The substantially pure magnesium hydroxide slurry will not form a sufficiently adherent layer of coating material of proper thickness on the ferrous material to withstand the subsequent handling and bending of the coated ferrous material, for example, the bending necessary in the formation of a magnetic core. The coating, under such circumstances, has a great tendency to flake and drop off thus creating excessive dust during the formation of the core with its resulting problems to equipment and to the health of the workmen. Of course, such flaking also results in inferior interlaminar insulation after annealing.

A number of additives have been proposed to be added to the magnesium hydroxide slurry which would help the magnesium hydroxide adhere to the surface of the ferrous material. However, it has been found that many of these additives create other probdems. For example, many of these additives introduce additional carbon or other contaminants to the steel, thereby causing either higher initial losses or higher aging losses, or both such additional losses, when such material is used in magnetic cores for electrical magnetic apparatus. From the above it is obvious that there is a great need in the electrical industry for a coating material which will form a tenacious, adherent coating on ferrous material, such as silicon steel, while at the same time not detracting from the optimum magnetic characteristics of such silicon steel.

It is, therefore, one object of this invention to provide a tenacious coating on ferrous material comprised substantially of magnesium hydroxide, which coating will not detract from the magnetic properties of the ferrous material.

It is a further object of this invention to provide a process for coating ferrous material with a coating comprised substantially of magnesium hydroxide.

It is a further object of this invention to provide a coating of magnesium hydroxide utilizing additives which will provide a tenacious, coherent film of the hydroxide to ferrous material without detracting from the magnetic properties of such materials.

It is a further object of this invention to provide additives for a magnesium hydroxide slurry which additives will materially aid the magnesium hydroxide in firmly adhering to a ferrous material without having any deleterious effects on the characteristics of the ferrous material.

In application Serial No. 99,558; filed March 30, 1961, for Process for Coating Ferrous Material and Material Coated by Such Process, in the names of Walter G. Hoehn, Herbert B. Forslund and James W. Fulton, now Patent No. 3,073,722 and assigned to the same assignee as this application, there is disclosed and claimed a process and coating for ferrous material in which the addition of a carboxylic acid to a magnesium hydroxide slurry provides a tenacious, adherent coating to ferrous material. It has since been discovered that the coating on ferrous material can be made more adherent if two specific carboxylic acids are both added to the magnesium hydroxide slurry. Thus, this application provides an improved process and coating over that disclosed and claimed in the aforementioned application Serial No. 99,558.

In carrying out this invention in one form, an adherent film substantially of magnesium hydroxide is provided on the surface of a strip of ferrous material by first providing a slurry comprising a suspension of magnesium hydroxide in water. Oxalic acid is then added to the slurry and admixed therewith. Formic acid is then added to the slurry and also thoroughly mixed therewith. The suspension is then applied to the surface of the ferrous material in any desired manner and then dried to remove any excess absorbed water. An adherent film comprised substantially of magnesium hydroxide will remain on the surface of the ferrous material.

The features of this invention which are believed to be novel are set forth with particularity in the appended claims. However, it is believed that the invention itself and the manner in which its objects are obtained, as well as other objects and advantages thereof, will be more fully understood by reference to the following detailed description therof, when read in connection with the accompanying drawing. The drawing is a flow diagram illustrating one form of the process of this invention.

It has been discovered that unexpected, improved results may be obtained in magnesium hydroxide coatings for ferrous magnetic material when the slurry of magnesium hydroxide is provided with additions of oxalic and formic acids. In general, it has been discovered that when a quantity of an oxalic acid, approximately one part by weight of oxalic acid crystals to 3 parts by weight of magnesium oxide and a quantity of formic acid, approximately 3 to 8 cc. of formic acid to 35 grams of magnesium oxide, is admixed in a slurry of magnesium hydroxide that the mixture obtained, when applied to the surface of ferrous material, and dried thereon, will provide a very strong, tenacious coating which adheres to the ferrous material and coheres to itself. The coating obtained on the ferrous material by such process is highly resistant to flaking even prior to any high temperature annealing step and is strongly bonded to the ferrous material, such that it resists flaking during the handling and bending which is necessarily encountered, for example, during the formation of the ferrous material into a magnetic core.

The oxalic acid alone provides a very tenacious coating, but one which tends to dust when subject to abrasion. The addition of the small quantity of formic acid cures this dusting tendency, although the addition of a similar quantity of oxalic acid, or any other carboxylic acid, will not cure this dusting problem. Further, it was noted that the addition of formic acid caused rust spots to form on the ferrous material. By adding a small quantity of magnesium chromate, approximately 3 grams to each 35 grams of the starting magnesium oxide powder, the formation of rust spots was substantially eliminated. Also, it was found that these additives did not effect the magnetic properties of the ferrous material.

In making magnesium hydroxide coatings of this invention, an aqueous suspension of magnesium hydroxide is employed. In the preferred method of forming the slurry, a magnesium oxide powder is used. In forming this slurry approximately 5.5 to 8% by weight of magnesium oxide is suspended in water and is thoroughly mixed until substantially complete hydration of the magnesium oxide is obtained. Thus the slurry will be substantially magnesium hydroxide. However, as will be understood by those skilled in the art, with the commercial grades of magnesium oxide available today, it is not always possible to obtain complete hydration of all of the magnesium oxide particles. Additional water may be added and mixed with the slurry at this time, if desired, to reduced the viscosity of the suspension. A 10% concentration of oxalic acid is added to this slurry in an amount of approximately one part by weight of acid crystals to three parts by weight of the original magnesium oxide powder. Then, formic acid is added, approximately 3 to 8 cc. to 35 grams of the original magnesium oxide powder. The slurry is again completely mixed so as to obtain substantially a complete mixing of the oxalic and formic acids throughout the suspension.

If a suspension of less than approximately 5.5% by weight of magnesium oxide powder is used to form the slurry, the resultant coating does not provide a sufficient amount of magnesium hydroxide to the ferrous material. When the suspension contains more than approximately 8% by weight of magnesium oxide powder, the slurry becomes too difficult to process in the desired manner. Also, the addition of the oxalic acid of less than approximately one part by weight per three parts by weight of the original magnesium oxide powder and less than approximately 3 cc. of formic acid to 35 grams of magnesium oxide powder provides a coating to the ferrous material which will tend to dust when abraded. Further, if more than approximately one part by weight of the oxalic acid per three parts by weight of the original magnesium oxide powder is added to the slurry, the adhesion and cohesion of the coating obtained deteriorates very rapidly. The quantity of formic acid over 3 cc. per 35 grams of magnesium oxide powder is not critical as far as the cohesion and adhesion of the coating is concerned. As much as 16 cc. per 35 grams of magnesium oxide powder may be used without deterioration of the coating. However, when the quantity of formic acid exceeds approximately 8 cc. per 35 grams of magnesium oxide, the formation of rust spots on the ferrous material increases substantially. Further, chromate may be added to eliminate this problem; however, larger quantities of magnesium chromate, above approximately 3 grams per 35 grams of magnesium oxide powder causes deterioration of the magnesium hydroxide coating. Thus, the range of formic acid may extend from approximately 3 cc. to 16 cc. per 35 grams of magnesium oxide powder, but the preferred range is from approximately 3 cc. to 8 cc. per 35 grams of powder.

The resulting coating which is obtained by the above-noted mixture may be applied to the surface of a sheet or strip of ferrous material in any desired manner, such as, for example, by roller coating on the material. This coating may be dried upon the sheet at a surface temperature not more than approximately 135° C. If the drying is carried out above out above this temperature, there is a tendency for the coating to break down, leaving a spotty coating rather than the thin, even coat desired. After drying there remains on the surface a thin film of substantially magnesium hydroxide which has an excellent resistance to abrasions and which will permit 90° bending without flaking of the coating thereon. For example, a coating of the above mixture was applied to a strip of silicon steel 0.012 inch thick. The coating obtained was approximately 0.02 to 0.03 ounce per square foot of steel and did not flake when subjected to 90° bending.

After formation of a magnetic core of silicon steel, having been coated by the above mixture, the core may then be subjected to a high temperature anneal either of the grain growth anneal in the range of approximately 950 to 1200° C. or of a stress relief anneal of approximately 840° C. without damage the coating and without sticking or welding of the various layers of the silicon steel.

The invention herein described is extremely useful in providing a strong, tenacious coating on ferrous material. In preparing suspensions according to the method of this invention, the following examples set forth different suspensions which have been found satisfactory in carrying out this invention.

*Example 1.*—An aqueous suspension of approximately 8% by weight of magnesium oxide was prepared and the suspension thoroughly mixed until substantially complete hydration of the magnesium oxide was obtained. A 10% concentration of oxalic acid was prepared. A sufficient amount of the solution was added to the slurry to obtain a composition having 9 grams of magnesium oxide, 111 grams of water and 3 grams of oxalic acid. Then approximately ¾ cc. of formic acid was added to the slurry. Also approximately ¾ gram of magnesium chromate was added. The slurry was continuously mixed during addition of the acid. The slurry was thoroughly mixed to completely disperse the oxalic acid, the formic acid, and the magnesium chromate throughout the suspension. It was noted that the viscosity of the suspension first increased and then decreased to a fairly low value during the addition. After the addition was completed, the suspension was then coated on the surface of the silicon steel by roller coating. The coated silicon material was then dried at a surface temperature of approximately 135° C. thus forming a firmly adherent coating substantially of magnesium hydroxide on the silicon steel material.

*Example 2.*—In this example a slurry of approximately 7% by weight of magnesium oxide in water was prepared, the slurry being thoroughly mixed until substantially complete hydration of the magnesium oxide was obtained. To this slurry was then added approximately one part by weight of oxalic acid crystals to three parts by weight of the starting magnesium oxide powder, the oxalic acid being first mixed with water to form a 10% concentration. Then 3 cc. of formic acid and 3 grams of magnesium chromate were added for each 35 grams of the starting magnesium oxide powder. The slurry was then completely mixed to obtain susbtantially complete mixing of the oxalic acid, the formic acid and the magnesium chromate throughout the suspension. The mixture was then coated on a silicon steel strip by the use of roller coating. The coated material was then dried by heating the steel to a surface temperature of approximately 135° C. leaving a very tenacious, adherent film substantially of magnesium hydroxide.

*Example 3.*—An 8% magnesium hydroxide slurry with oxalic acid was prepared having a composition of 9 grams of magnesium oxide, 111 grams of water and 3 grams of oxalic acid. Approximately 2 cc. formic acid was added to this slurry. The slurry was thoroughly mixed to completely disperse the oxalic acid and formic acid throughout the suspension. This suspension was coated by means of a roller on the surface of a strip of silicon steel. The coated steel was then dried at approximately 135° C. The film or coating remaining on the steel strip firmly adhered to the steel and was very resistant to abrasion and bending.

It will be undestood that the above examples are for illustrative purposes only and should not be considered as limiting the scope of the invention herein set forth. While this invention has been disclosed with reference to particular embodiments, it should be understood that various changes may be made without departing from the spirit and scope of the invention as defined in the appended claims.

What is claimed as new and which it is desired to secure by Letters Patent of the United States is:

1. A ferrous material having thereon a firmly adherent coating comprising the reaction product of magnesium hydroxide and oxalic and formic acids formed by application of a slurry consisting essentially of an aqueous suspension of approximately 5.5 to 8% by weight magnesium oxide and acid, said oxalic acid being present in a quantity of approximately one part by weight to each three parts by weight of said magnesium hydroxide, and said formic acid being present in a quantity of approximately 3 to 8 cc. to each 35 grams of magnesium oxide, said coating being dried at a temperature not in excess of approximateley 135° C.

2. A method of forming an adherent coating on the surface of ferrous material consisting of the steps of forming an aqueous slurry containing approximately 5.5 to 8% by weight of magnesium oxide, adding one part by weight of oxalic acid to said slurry for each 3 parts by weight of said magnesium oxide, and 3 to 8 cc. of formic acid for each 35 grams of magnesium oxide, applying said slurry to the surface of the ferrous material and then heating said surface to a temperature not in excess of approximately 135° C. to dry said slurry and leave on said surface a tenacious coatitng which is the reaction product of magnesium hydroxide and acid.

3. A ferrous material having on the surface thereof a firmly adherent coating composed of the reaction product of magnesium hydroxide and acid formed by application of a slurry consisting essentially of an aqueous suspension of 5.5 to 8% by weight of magnesium oxide and oxalic and formic acids, said oxalic acid being present in a quantity of approximately one part by weight to each three parts by weight of said magnesium oxide, and said formic acid being present in a quantity of approximately 3 to 16 cc. to each 35 grams of magnesium oxide, the coating being dried at a temperature of approximately 135° C.

4. A method of forming an adherent coating on the surface of a ferrous material consisting of the steps of forming a slurry of approximately 7% by weight of magnesium oxide in water, adding oxalic acid to said slurry, said oxalic acid being approximately one part by weight per 3 parts by weight of said magnesium oxide, adding formic acid to said slurry, said formic acid being approximately 3 to 16 cc. to each 35 grams of magnesium oxide, applying said slurry to the surface of the ferrous material, and drying said slurry on the surface at a temperature not in excess of approximately 135° C. to obtain a tenacious coating which is the reaction product of hydrated magnesium oxide and oxalic and formic acids.

5. A method of forming an adherent coating on the surface of a ferrous material as set forth in claim 4 in which the preferred range of formic acid addition is approximately 3 to 8 cc. to each 35 grams of magnesium oxide powder.

6. A method of forming an adherent coating on the surface of a ferrous material as set forth in claim 5 in which approximately 3 grams of magnesium chromate is added to said slurry for each 35 grams of magnesium oxide powder.

References Cited by the Examiner

UNITED STATES PATENTS 3,073,722  1/63  Hoehn et al. _____ 117—127

RICHARD D. NEVIUS, *Primary Examiner.*

WILLIAM D. MARTIN, *Examiner.*